United States Patent Office 3,365,420
Patented Jan. 23, 1968

3,365,420
INTUMESCENT FIRE RETARDANT POLY-
URETHANE COATING COMPOSITIONS
Charles C. Clark, Kenmore, and Arthur J. Krawczyk,
Cheektowaga, N.Y., assignors to Textron Inc., a corporation of Rhode Island
No Drawing. Filed May 13, 1965, Ser. No. 455,645
19 Claims. (Cl. 260—45.85)

ABSTRACT OF THE DISCLOSURE

Intumescent fire retardant coating compositions are made by reaction of aromatic diisocyanates, e.g., tolylene diisocyanate; phenoxy ether diols, especially such halogen-containing diols, e.g., pentachlorophenoxy glyceryl ether; and aliphatic polyhydric alcohols, e.g., triethylene glycol. The coating compositions contain free isocyanate groups which make the products moisture-curing. The fire retardant and intumescent characteristics of the compositions can be improved by the addition of haloalkyl phosphates such as tris(halogen lower alkyl) phosphates, with or without the incorporation of a lower alkylene diamine tetra-acetic acid, e.g., ethylene diamine tetra-acetic acid.

---

This invention relates to fire retardant coating compositions. More particularly, the present invention is concerned with fire retardant coating compositions made by reaction of an aromatic diisocyanate, a phenoxy ether diol and a polyhydric alcohol. In one specific and preferred embodiment the coating composition contains a phosphate material and the properties of the product may be even further enhanced by including an alkylene diamine tetra acetic acid. Coatings produced from the compositions of this invention are moisture-curing due to the presence of isocyanate groups and the coating is especially distinguished by its intumescent properties.

The importance of imparting fire retardant characteristics to building materials and other substrates of the flammable type is widely recognized. By and large it is not practical, even if possible, to make flammable building materials completely fire resistant. However, it is very desirable to give to such materials sufficient fire retardant properties to delay the spread of fire to allow the escape of occupants from burning structures and to give time for firemen to arrive on the scene to take action before the structure is consumed and the fire transferred to nearby buildings and equipment. A most convenient manner of imparting such characteristics to the building materials is to coat them with a liquid which will cure or dry to a more or less hard film in the presence of the moisture in the atmosphere. These coating materials often have as a principal ingredient a base which is referred to as a moisture-curing vehicle. Such products are applied to plywood and other types of panelling and combustible materials used in forming walls and other structures in commercial and domestic buildings.

There are several ways in which the fire retardant properties of building materials may be evaluated. There has been adopted a test procedure designated ASTM E–84 in ASTM Standards 1961, Part 5, p. 1178, Surface Burning Characteristics of Building Materials. This test serves to classify building materials as to their burning characteristics and to provide data regarding (1) flame spread; (2) fuel contributed; and (3) density of smoke developed during exposure to fire. The material tested is given a comparative rating with the properties of red oak serving to indicate a value of 100 in all three of the categories while asbestos-cement board is assigned a 0 rating in each instance. This test is very severe and there is great difficulty in providing sufficient resistance to burning with respect to the wide variety of building materials, especially if the cost is to be kept within practical limits and the other desirable properties of the materials are not to be unduly deleteriously affected.

Another procedure for evaluating the fire retardant properties of building materials can be readily applied in the ordinary laboratory. This operation employs a small metal cabinet described in ASTM D 1360 found in ASTM, Part 21, January 1965, Fire Retardancy of Paints (Cabinet Method), the cabinet having a glass door for observing burning in the cabinet. The cabinet also has holes around its bottom for air draft with a chimney serving as a smoke outlet. A 12" x 6" x ¼" wood panel, for instance, poplar or even birch plywood for a more rigorous test, is covered with the coating to be tested and then the coating is allowed to dry or cure for at least about 2 days. Two or three coats may be applied and three coats give a good film thickness for an adequate determination of fire retardance and intumescence. The coated panel is placed on a metal frame at a 45° angle in the test cabinet. A measured amount of ethanol, for instance, 1 cc. or even 5 ccs. for a more severe test, is placed in a small iron cup below the panel, so that when the ethanol is burned the flame impinges against the under side of the panel. In the test the ethanol is ignited and allowed to burn out and the degree of burning of the panel and amount of intumescence are observed during burning and also when burning is finished.

The present invention provides a normally liquid, moisture-curing coating material or vehicle which when applied to a flammable building material or other combustible substrate imparts thereto outstanding resistance to burning in terms of flame spread and fuel contributed. The coatings may also have good stability, hardness and flexibility upon drying. The coatings have these properties as a result of a selection of the ingredients of the vehicle which also serve at least in substantial part to provide desirable fire retardant properties through intumescent action. Thus our compositions are made by reaction of an aromatic hydrocarbon diisocyanate, a phenoxy ether diol and an aliphatic polyol. The compositions of the present invention not only exhibit intumescence, but in addition, they do not contribute to burning, rather they serve to prevent the spread of flames and in effect extinguish the burning of the substrate.

One ingredient of the coating composition of the present invention is an aromatic hydrocarbon diisocyanate and one or more of a variety of diisocyanates may be employed. The isocyanates may be substituted with non-interfering groups, such as aliphatic hydrocarbon radicals, e.g. lower alkyl radical groups. Suitable diisocyanates include 2,6-tolylene diisocyanate, 2,4-tolylene diisocyanate, p-phenylene diisocyanate, p,p'-diphenylmethane diisocyanate, 1,5-naphthylene diisocyanate, substituted aromatic diisocyanates, etc. The hydrocarbon portion of the diisocyanate has at least about 6 carbon atoms and usually does not have more than about 24 carbon atoms. Aromatic diisocyanates of 6 to 12 carbon atoms in the hydrocarbon group are preferred. The amount of diisocyanate component employed is such as to give a ratio of isocyanate groups to hydroxyl radicals of about 1.5 to 2.5:1, preferably about 1.8 to 2.2:1, based on the total of the diisocyanate, phenoxy ether diol and aliphatic polyol. The reaction mixture contains an excess of isocyanate groups sufficient to provide a moisture-curing vehicle. The isocyanate groups in the vehicle, aside from any unreacted diisocyanate present, are generally at least about 0.1 weight percent of the composition, e.g. up to about 15% with about 0.5 to 8% being preferred.

The second essential component of the fire retardant and intumescent coating composition of the present invention is a phenoxy ether diol, preferably a polyhalo-substituted phenoxy ether diol. These preferred materials can be made, for example, from chlorodihydroxy alkanols through reaction with a suitable sodium polyhalophenate. The phenoxy ether diols can be represented by the formula:

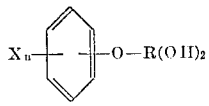

in which X is halogen having an atomic number from 17 to 35, that is, chlorine or bromine and $n$ is a number from 0 to 5, preferably 2 or even 3 to 5. Also in the formula, R is a divalent alkylene, including cycloalkylene, radical of 3 to 12 carbon atoms, preferably 2 to 6 carbon atoms. The preferred polyhalophenoxy ether diol is pentachlorophenoxy glyceryl ether which has the structure

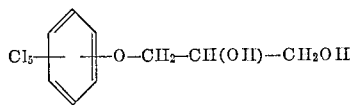

however, other suitable and similar materials may be employed. The phenyl group of these compounds may be substituted, e.g. with lower alkyl groups, and the compounds may also contain other non-interfering substituents. It is preferred that the two illustrated hydroxy groups of this reactant be attached to separate secondary and primary carbon atoms. Also the alkyl radical R may have its carbon-to-carbon chain interrupted as with one or more oxygen atoms. Representative reagents of this type include, for instance, phenoxyglyceryl ether, 2,4,6-trichlorophenoxy glyceryl ether, 1-tetrabromotoloxy-3,4-dihydroxy butane, 1-pentachlorophenoxy-2,6-dihydroxy-hexane, etc.

The other essential reactant employed in making the polyurethane-type reaction product of the present invention is an aliphatic polyol. This alcohol has at least 2 carbon atoms, and among the wide variety of such materials which can be used are those represented by the formula:

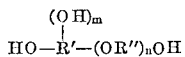

in which R' is an aliphatic hydrocarbon radical, preferably saturated, and R'' is an alkylene radical of 2 to 4, preferably 2 to 3 carbon atoms, R' generally has 2 to 12, preferably 2 to 6 carbon atoms. The letter $n$ represents a number from 0 to about 50, preferably 2 to 30 for more flexible coatings, while the letter $m$ is 0 to 1, preferably 0. When $n$ is other than a zero, R' will often be the same as R''. The aliphatic polyol reactant can be substituted with non-deleterious substituents and the lower molecular weight polyether glycols, e.g. of 2 to 4 ethylene oxide units, are preferred reactant materials.

The amounts of phenoxy diol and aliphatic polyol in the reaction product are usually such as to give a weight ratio of these ingredients of about 1:10 to 10:1. Often these ratios are about 1:3 to 3:1, with ratios of the phenoxy diol to the aliphatic polyol of about 1.5 to 3:1 being a preferred form. Approximately equal molar ratios of these ingredients are also advantageous.

Suitable aliphatic polyols include ethylene glycol, polyethylene glycols, for instance, of up to about 2000 molecular weight, propylene glycol, polypropylene glycols, for instance, of up to about 2500 molecular weight, trimethylol propane, trimethylol ethane, 1,6-hexamethylene glycol, 1,2,6-hexanetriol, etc. The aliphatic polyols of essentially dihydroxy functionality, i.e. where $m$ is 0, are preferred. Moreover, it is further preferred that the diol bear essentially no active hydrogen atoms other than those of the two hydroxyl groups.

The normally liquid polyurethane-type reaction product of the present invention can be made by simultaneous reaction of the diisocyanate, phenoxy ether diol and aliphatic polyol. Alternatively, the diisocyanate can be reacted with part or all of one of the phenoxy ether diol and aliphatic polyol prior to reaction with the remaining portion of these materials. Stepwise mixing of the diisocyanate with the ether diol and polyol is preferred to enhance temperature control. The reaction temperatures are often in the range of about 60 to 120° C., with about 90 to 110° C. being preferred; and the reaction is preferably continued until there is essentially little, if any, unreacted hydroxyl functionality remaining.

The reaction product of the present invention is commonly prepared in the presence of an essentially inert solvent. The solvent serves to insure that the reactants are in the liquid state and the solvent enables better temperature control during the reaction by serving as a heat sink and, if desired, as a refluxing medium. Various solvents including mixtures of such materials may be employed and among the useful solvents are aromatic hydrocarbons, esters, ethers, ester-ketones, chlorinated hydrocarbons, etc. Frequently, the solvents are volatile materials which will be removed from the composition while it cures as a coating or film and in such case, there may be no need to remove any portion of the solvent from the reaction product prior to application as a coating. The solvent may be a relatively non-volatile material and may be selected with a view to improving the fire retardant properties of the coating, for instance, when chlorinated hydrocarbons are used. If the solvent is to be removed from the reaction product before it is applied as a film, the removal should be done in the absence of significant moisture, since moisture causes curing of the composition. The amount of solvent employed may vary widely and large volumes may be uneconomic or give materials with undesirably or inconveniently low viscosity. The amount of solvent may be selected in order to provide a reaction product of film application viscosity, but products of greater viscosity can be cut-back before use. Often we use about 0.25 to 6 weights of solvent, preferably about 0.5 to 3 weights of solvent, per weight of the isocyanate, phenoxy ether diol and aliphatic polyol polymer. Among the suitable normally liquid solvents are xylene, ethylene glycol ethyl ether acetate, 1,1,1-trichloroethane, dimethylformamide, dimethylsulfone, dioxane, etc. and their mixtures; and we prefer that the solvent not contain more than about 10 carbon atoms per molecule.

The compositions of the present invention can have additional ingredients which impart desirable properties, i.e. the compositions have additive susceptibility. Thus, the fire retardant and intumescent characteristics are enhanced by the presence of haloalkyl phosphates, preferably tris (haloalkyl) phosphates. The halogen component of the phosphate has an atomic number from 17 to 35, that is chlorine or bromine, and preferably the alkyl is monohalo-substituted. Chlorine is the preferred halogen. The alkyl, including cycloalkyl, groups are preferably lower alkyl radicals and in general, alkyls of a lesser number of carbon atoms, e.g. 2 or 3 are preferred, as they have lower fuel and smoke potential. The amount of haloalkyl phosphate in the composition is sufficient to have the desired effect and is often about 20 to 60, preferably about 30 to 50 weight percent on the basis of the diisocyanate, phenoxy diol and aliphatic polyol combination and the phosphate. If desired, the phosphate can be added to the composition before or after reaction of the diisocyanate, phenoxy ether diol and aliphatic polyol, but preferably the addition is after the reaction.

In order to further enhance the fire retardant and intumescent characteristics of the haloalkyl phosphate-containing coating composition of the present invention we can include an effective amount of a lower alkylene diamine tetraacetic acid. The alkylene members may have 2 to 4 carbon atoms, and we prefer to use ethylene diamine tetra acetic acid. When the diamine is employed along with the haloalkyl phosphate, products of most outstanding fire retardant and intumescent characteristics are produced. In general, the coating composition will contain about 20 to 60 weight percent of the alkylene diamine tetraacetic acid, preferably the amount is about 30 to 50 weight percent, on the basis of the polymer composed of diisocyanate, phenoxy ether diol and aliphatic polyol, and the alkylene diamine tetra acetic acid.

The diamine may not be soluble in the coating composition to the extent of diamine present and it is therefore desirable to add the diamine as a finely divided material and disperse it throughout the composition. The compositions of the present invention which contain water-soluble forms of the lower alkylene tetra acetic acid, for instance, ethylene diamine tetra acetic acid when applied as coatings may be sensitive to water contact as would occur during washing or use in a humid atmosphere. To counteract this possible difficulty, we prefer that the flammable substrate for the coating be covered with the fire resistant and intumescent composition which contains both the halogenated alkyl phosphate and the lower alkylene diamine tetra acetic acid and then cover such film with a similar coating material in which the latter component is omitted. The resulting films are resistant to water leaching and show good hardness and excellent fire retardance and intumescence.

Our coating compositions are normally applied to substrates as films of less than 10 mils thickness and can contain other additives to impart special properties such as plasticizers, etc. Also, the substrate for the coating may be specially treated materials, including flammable members impregnated with fire-resistant chemicals or coated with a sealant.

The following examples will serve to illustrate the present invention but should not be considered limiting.

*Example I*

Pentachlorophenoxy glyceryl ether (400 grams), 420 grams polypropylene glycol (1025 molecular weight), 455 grams xylene and 455 grams Cellosolve acetate (ethylene glycol ethyl ether acetate) were charged to a flask provided with a reflux condenser, a thermometer, a water trap, a stirrer, an inlet for nitrogen and a glass mantle for heating. This mixture was azeotroped for one hour to remove water. When all of the water had collected in the trap, the mixture was cooled to 32° F. by means of Dry Ice and acetone. 540 grams of tolylene diisocyanate (99% 2,4- and 1% 2,6-isomers) were added. The temperature rose in one hour and 35 minutes to 104° F. where it was maintained for 9 hours. The product was cooled. It analyzed 58.0 percent solids, 5.92 percent free NCO, 5½ Gardner color and $A1+¼$ Gardner viscosity. This product dried in air without catalyst in about 24 hours. With one percent dibutyl tin dilaurate based on solids, it dried in 4 hours. Two coats of this vehicle were brushed onto poplar allowing suitable drying to occur for each coat. Fire retardance and intumescence were shown by this vehicle when tested in the cabinet described above.

*Example II*

Two thousand grams of a xylene solution containing 31.6 percent by weight of pentachlorophenyl glyceryl ether, 270 grams of triethylene glycol and 790 grams of xylene were charged to a glass flask equipped with a reflux condenser, water trap, nitrogen inlet, stirrer and heating mantle. This mixture was heated while water and xylene distilled over under azeotropic conditions (190° F.) for one hour after which all of the free water in the batch had been removed. Twelve-hundred fifty grams of toluene diisocyanate (Example I) was added to the batch. This addition was followed by the generation of heat in the batch causing the temperature to rise to 206° F. within a period of four minutes. The batch was then cooled to 108° F. and maintained at a temperature of 100 to 106° F. for three hours during which the batch was continuously agitated. At the end of this time the product analyzed 6.20 percent NCO, had a vehicle solids of 49.8 percent, a color of 12 and a viscosity of D+.

This vehicle was coated at 6 mils dry film on wood and cured with addition of one percent N-coco morpholine. On burning in the test cabinet the film exhibited fire retardancy and intumescence.

*Example III*

One hundred grams of a fire retardant vehicle containing approximately 50 grams of vehicle solids in xylene whose preparation is described in Example II was mixed with 25 grams of tris (betachloroethyl) phosphate.

Other similar products were prepared from this base vehicle using the following quantities in grams:

| Base vehicle solids: | Tris (betachloroethyl) phosphate |
|---|---|
| 160 | 20 |
| 120 | 40 |
| 100 | 25 |

All of these products gave films on wood having good dry times, flexibility, color and hardness. The films (5 to 6 mils dry film) exhibited fire retardancy and intumescence when burned in the test cabinet using 1 cc. of absolute ethanol in the test cup.

*Example IV*

Ninety-one grams (0.5 equivalent) of trichlorophenoxy glyceryl ether, 37.5 grams (0.5 equivalent) triethylene glycol, 122 grams xylene and 148 grams of Cellosolve acetate were charged to a reaction flask provided with a reflux condenser, water trap, thermometer, stirrer, nitrogen inlet and electric glass mantle for heating. The mixture was heated until all of the water was removed by azeotroping with the xylene present. The mixture was cooled to 8° C. and 174 grams (2 equivalents) of tolylene diisocyanate (Example I) added. A bath of Dry Ice and acetone was used for cooling. After adding the tolylene diisocyanate an exothermic reaction occurred with the temperature rising to 65° C. in one minute. The temperature then dropped to 42° C. in 10 minutes when the percent NCO was 8.02, the Gardner color 4½ and the viscosity A3. After one hour and 35 minutes more, the temperature was 35° C., the percent NCO 7.75, the Gardner color 4 and the viscosity A2.

Two parts by weight of the solids of this vehicle (53 percent solids) and one part of tris (2-chloroethyl) phosphate were mixed. This vehicle and the same without tris (2-chloroethyl) phosphate were coated (2 coats) on 12" x 6" x ¼" poplar boards. Four percent N-coco morpholine was used as a moisture curing agent in each case. The coating without phosphate ester added dried in 3½ hours to a hard crazed film. The other coating dried in 5½ hours.

Both films were burned in the test cabinet and both showed fire retardancy. The product containing the phosphate ester showed more intumescence than the one without the ester.

*Example V*

Fifty grams of solids of a clear polyurethane vehicle made by condensing approximately 1 part by weight triethylene glycol, 2.4 parts by weight pentachlorophenoxy glyceryl ether and 4.6 parts by weight tolylene diisocyanate (Example I) in equal parts by weight of xylene and Cellosolve acetate so as to prepare a prepolymer having a percent NCO of about 5.5 to 6 were mixed with 25 grams of tris (2-chloroethyl) phosphate and 25 grams of finely powdered ethylene diamine tetra acetic acid which had previously been ground with the tris (2-chloroethyl) phosphate in a ball mill for several hours. One percent of N-coco morpholine based on vehicle solids was added to this vehicle as a catalyst for its moisture cure. A typical analysis for this vehicle is NV 54, viscosity A2, color hazy, percent NCO 2.79, free TDI 1.2.

Birch plywood boards, 12″ x 12″ x ¼″ were coated with this vehicle at 3 coats (11 mils) and 2 coats (7 mils). This vehicle dried on these boards in about four hours at room temperature. After allowing these boards to cure for several days, they were burned in the test cabinet for evaluation of fire retardant vehicles using 1 cc. of absolute ethanol in the metal cup. The burned panels exhibited excellent intumescence and the plywood under the intumescent foam was scarcely burned. When this same vehicle without the ethylene diamine tetra acetic acid as an ingredient was coated onto similar boards and burned in the test cabinet, fair intumescence was produced and some destruction of the ply just under the vehicle coating had occurred.

*Example VI*

1500 grams of pentachlorophenoxy glyceryl ether (PCP) was warmed to melt it and dissolve it in xylene solvent. The PCP content of the xylene-PCP solution was 55.5 percent. 336 grams of triethylene glycol (TEG) was added to the 5 liter reaction flask which was provided with an electric mantle heater, a mechanical stirrer, an inlet for nitrogen, a thermometer, a reflux condenser and a trap for collecting water distilled from the system. This mixture was heated for one hour during which water was azeotroped and collected in the water trap. The dry mixture was poured into another vessel to be added later to the aromatic diisocyanate in solvent.

350 grams of Cellosolve acetate and 833 grams of xylene were added to the reaction flask and the mixture azeotroped for one hour at 140–150° C. to remove water. The solvents were then cooled to 100° C. 1560 grams of tolylene diisocyanates (80% 2,4- and 20% 2,6-isomers) were added under nitrogen to the solvents. With the temperature at 100°±5° C. the previously dried PCP–TEG mixture was added in steps over one hour. One-fourth of the mixture was added at the end of each quarter hour period. A cooling mixture was applied to the reaction flask during the addition of the mixture of diols.

The following log illustrates the conditions used in this process:

| Time Minutes | Temperature, °C. | Gardner Viscosity | NCO, Percent | Gardner Color |
|---|---|---|---|---|
| 0 | | | | |
| 15 | 103 | A5 | 18.13 | 7+ |
| 30 | 103 | Z2+⅛ | 11.13 | 10− |
| 45 | 99 | T+¼ | 7.26 | 11− |
| 60 | 99 | Z−¼ | 5.95 | 11− |

The fact that the viscosity at 45 minutes was T+¼ may be explained by assuming that the addition of diols thinned the mixture and that the viscosity was measured before the newly added diols had reacted. After the reaction was complete, 1.4 grams of orthocrlorobenzoyl chloride was added as a stabilizer at the beginning of the cooling cycle.

Analysis of the final vehicle after cooling showed NV 62.4, percent NCO 5.91, viscosity Z+⅓, Gardner color 11+, free TDI 3.04% and specific gravity 1.1601.

*Example VII*

The compositions of this invention have been tested by the ASTM E–84 procedure described above.

The following table gives some results of the test:

TABLE I

| Example V Vehicle Type [1] | Film Thickness (mils dry film) | Flame Spread | Fuel Contributed | Smoke Developed |
|---|---|---|---|---|
| 1 | 4 | 60 | 30 | 105 |
| 1 | 6 | 55 | 20 | 130 |
| 1 | [2] 4 | 45 | 20 | 115 |
| 2 | 2 | | | |
| Asbestos board | | 0 | 0 | 0 |
| Red Oak | | 100 | 100 | 100 |
| Douglas fir | | 110 | | |

[1] Vehicle type 1 was prepared as in Example VI and vehicle type 2 was the same as vehicle type 1 without the ethylene diamine tetraacetic acid.
[2] The film consisted of 4 mils of vehicle type 1 covered by 2 mils of vehicle type 2.

*Example VIII*

Ninety grams (0.5 equivalent) of pentachlorophenoxy glyceryl ether, 11 grams (0.25 equivalent) trimethylol propane, 87 grams xylene and 87 grams ethylene glycol ethyl ether acetate were placed in a flask which has a thermometer, reflux condenser, water trap, inlet for nitrogen, glass mantel heater and stirrer. This mixture was azeotroped at about 150° C. for 1.25 hours to remove traces of water from it. The batch was then cooled to 40° C. when 43.5 grams of 2,4 - tolylene diisocyanate was added. This caused an exotherm to 66–70° C. The batch was cooled quickly to 25° C. when 87.0 grams of 2,4 - tolylene diisocyanate was added after 20 minutes from the first addition of diisocyanate. The total equivalents of diisocyanate added was 1.5. The temperature of the batch was kept at 40° C. for 2 hours when the product was placed in a friction top paint can. The percent NCO of the product was 4.43 while the nonvolatile was 70.8 percent.

A film of this vehicle cut to 50 nonvolatile with dimethyl formaldehyde was brittle after drying rapidly. This film showed intumescence and fire retardance when burned in the test cabinet.

*Example IX*

One hundred sixty-nine grams (0.5 equivalent) of pentachlorophenoxy glyceryl ether, 33.5 grams (0.5 equivalent) of dipropylene glycol, 169 grams of ethylene glycol ethyl ether acetate and 111 grams xylene were charged to a glass flask provided with a thermometer, inlet for nitrogen, a stirrer, a glass mantel heater, reflux condenser and water trap. This mixture was heated for about 1 hour to remove water. The mixture was then cooled to 0° C. with a Dry Ice bath. One hundred seventy-four grams (2 equivalents) of 2,4 - tolylene diisocyanate was added. The temperature of the mixture rose to 40° C. and was maintained at this level for one hour. The percent NCO of this vehicle was 5.12 and the nonvolatile 64.3 percent. A film cast from this vehicle was slightly brittle and showed fire retardance and intumescence when burned.

*Example X*

One hundred sixty-nine grams (0.5 equivalent) of pentachlorophenoxy glyceryl ether, 29.5 grams (0.5 equivalent) 1,6 - hexylene glycol, 167 grams of ethylene glycol ethyl ether acetate and 109 grams of xylene were charged to a glass flask equipped with thermometer, inlet for nitrogen, stirrer, glass mantel heater, reflux condenser and water trap. This mixture was azeotroped for about one hour to dry it. The temperature was then lowered to 0° C. using a Dry Ice cooling bath. 174 grams (2 equivalents) of 2,4 - tolylene diisocyanate was added and the temperature of the mixture held at 40° C. for an hour. This vehicle dried in about 1.5 hours. The final percent NCO was 5.47 and the nonvolatile 63.1 percent. The film cast from this vehicle was slightly brittle and showed fire retardance and intumescence.

Example XI

One hundred fifty grams (0.44 equivalent) of a 55.5 percent solution by weight in xylene of pentachlorophenyl glyceryl ether, 14 grams (0.45 equivalent) of ethylene glycol, 35 grams of ethylene glycol ethyl ether acetate (Cellosolve acetate) and 83 grams of xylene were charged to a flask that has a thermometer, a water trap, a reflux condenser, glass mantel heater, nitrogen inlet, and stirrer. This mixture was distilled to remove water under azeotropic conditions for two hours. After the mixture was dry, 157 grams (1.8 equivalent) of tolylene diisocyanate (80 percent 2,4 isomer and 20 percent 2,6 isomer) were added while stirring. The temperature rose rapidly from 28 to 89° C. due to the reaction for the formation of polyurethane. After 30 minutes from the addition of the tolylene diisocyanate the temperature was 100° C. It was maintained at this point for 1 hour and 45 minutes. A sample of this vehicle analyzed 6.03 percent NCO, 5.06 percent free tolylene diisocyanate, 66.1 percent nonvolatile or solids, 12 minus Gardner color and Z8+⅔ Gardner viscosity.

When this vehicle was blended with ½ part tris (2-chloroethyl) phosphate per part of solids by weight, it dried in 2¾ hours. When it was blended with this amount of this phosphate ester and the same weight of ethylene diamine tetra acetic acid, the resulting product dried in 3½ hours. Both of the vehicles gave moderately flexible films when brushed on birch plywood. The Sward hardness of the first vehicle in the dried film was 24 while that of the second was 35. The vehicle modified with tris (2 - chloroethyl) phosphate showed good intumescence and fire retardance. The vehicle modified with tris (2 - chloroethyl) phosphate and ethylene diamine tetra acetic acid showed excellent intumescence and fire retardance.

Example XII

Forty-six grams (0.27 equivalent) of pentachlorophenoxy glyceryl ether, 19 grams triethylene glycol (0.26 equivalent) and 152 grams of 1,1,1 - trichloroethane were placed in a glass reaction flask which has a thermometer for measuring the temperature of the reaction mixture, a stirrer, a glass mantel heater, a reflux condenser, a water trap and an inlet for nitrogen. The mixture was heated for one hour at 80° C. in order to azeotrope off water and dry the mixture. The dried batch was then allowed to cool to room temperature when 87 grams (1.0 equivalent) of tolylene diisocyanate (80 percent 2,4 and 20 percent 2,6 isomer) were added. The temperature rose rapidly from 30 to 86° C. when the solvent refluxed from the condenser. The temperature was kept between 50 and 74° C. for 1½ hours when the batch was allowed to cool to room temperature. This vehicle analyzed 52.5 percent nonvolatile, 7.81 percent NCO, 5.39 percent free tolylene diisocyanate, S Gardner viscosity and 10½ Gardner color.

One-half part by weight of tris (2 - chloroethyl) phosphate per part of vehicle solids and one percent of N-coco morpholine based on vehicle solids were stirred into the batch. This vehicle dried in 7 hours to an uneven film on a glass plate or a Morest chart. When ½ part by weight of powdered ethylene diamine tetra acetic acid per part of solids was whipped into this vehicle on a Waring Blendor, the resulting vehicle dried on a Morest chart in 7½ hours. The film produced had a Sward hardness of 41. The film on birch plywood of the vehicle containing added tris (2 - chloroethyl) phosphate exhibited fair fire retardance and intumescence when burned in the test cabinet. The film on birch plywood of the vehicle containing added tris (2 - chloroethyl) phosphate and ethylene diamine tetra acetic acid showed excellent fire retardance and intumescence when burned in the test cabinet.

Example XIII

A reaction flask was set up with a heating mantel, thermometer for measuring the temperature of the batch, reflux condenser, water trap, stirrer and inlet for gaseous nitrogen. There were charged to this flask 46 grams (0.25 equivalent) pentachlorophenoxy glyceryl ether, 19 grams (0.25 equivalent) triethylene glycol, 152 grams ethylene glycol ethyl ether acetate and 76 grams tris (2-chloroethyl) phosphate. Eighty-seven grams (1.0 equivalent) tolylene diisocyanate (80 percent 2,4 and 20 percent 2,6 isomer) was added starting at 28° C. After 30 minutes when all of the tolylene diisocyanate had been added, the temperature was 32° C. Heat was applied in order to dissolve some undissolved pentachlorophenoxy glyceryl ether. The temperature rose during 1 hour and 35 minutes to 130° C. At 86° C. 1 hour and 15 minutes after beginning heating, 76 grams more of tris (2-chloroethyl) phosphate was added and stirred into the batch. After cooling to room temperature, the product analyzed 5.29 percent NCO, 1.60 percent free tolylene diisocyanate, Z7—1¼ Gardner viscosity and 8 plus Gardner color.

One percent of N-coco morpholine was added to this vehicle. One-half part by weight of ethylene diamine tetra-acetic acid per part of urethane solids (76 grams) was whipped into the vehicle in a Waring Blendor. The resulting mixture was coated on birch plywood panels (12" x 6" x ¼") giving a fairly thick coating (about 8 mils) which dried in about 11 hours to a soft pliable film. This film when burned in the test cabinet exhibited excellent fire retardance and intumescence.

Example XIV

Two hundred-eighty grams (0.84 equivalent) of a 55.5 percent by weight solution in xylene of pentachlorophenoxy glyceryl ether, 61 grams (.06 equivalent) of polypropylene glycol of molecular weight about 2025, 35 grams of ethylene glycol ethyl ether acetate and 83 grams of xylene were placed in a reaction flask provided with thermometer, reflux condenser, water trap, stirrer, electric mantel heater and inlet for nitrogen. This mixture was heated for 2 hours at the temperature of distillation to azeotrope off water and dry the mixture. After cooling the mixture to room temperature, 157 grams (1.8 equivalents) of tolylene diisocyanate was added. The temperature of the batch rose rather rapidly to 86° C. The temperature was then raised to 100° C. for 1 hour and 10 minutes after which the batch was cooled to room temperature. Analysis gave the following values: Nonvolatile 64.8 percent, NCO 4.00 percent, free tolylene diisocyanate 1.06 percent, Gardner viscosity Z6—⅙ and Gardner color 12 minus.

One percent of N-coco morpholine and ½ part by weight of tris (2-chloroethyl) phosphate per part of vehicle solids were mixed into this vehicle. This product was found to dry on a Morest chart in 3 hours to a film having a Sward hardness of 20 two days after drying. The film so produced burned with considerable smoking on birch plywood and melted and ran down. When ½ part by weight of ethylene diamine tetra acetic acid per part of urethane solids in the original vehicle was stirred into the vehicle containing catalyst and phosphate ester, it dried on a Morest chart in 3½ hours to a moderately flexible film. When a dried film of this vehicle was burned on birch plywood, it produced a moderate amount of smoke and showed fire retardance and intumesence.

Example XV

Chlorohexanediol was made by boiling 1,2,6-hexanetriol with concentrated hydrochloric acid, followed by distilling water, hydrogen chloride and the chlorohexanediol overhead. The product was water washed and contained about 65% of the chlorohexanediol. The crude product was reacted with sodium pentachlorophenate in a boiling xylene-water medium, followed by separating of the pentachlorophenoxy-hexanediol and water washing.

Triethylene glycol (4.2 grams, .056 equivalent) and 71 grams of a xylene solution containing 10.7 grams (.056 equivalent) of pentachlorophenoxyhexanediol were charged to a flask equipped with a stirrer, a reflux condenser, a water trap, a thermometer and a glass mantel for heating. This mixture was azetroped to remove water while removing 42 grams of xylene. Ethylene glycol ethyl ether acetate (17 grams) was added to make the calculated non-volatile content of the final product 50. The mixture was then cooled to room temperature and 19.7 grams (0.224 equivalent) of a mixture of 80 percent 2,4- and 20 percent 2,6-tolylene diisocyanate were added. The mixture was then heated to 100° C. for 2.75 hours until the percent NCO of the mixture was 5.81. Theory for reaction of these amounts of reactants is 6.8. The product further analyzed.

Non-volatile _____ percent__ 46.8
Free tolylene diisocyanate _____ do____ 3.20
Gardner viscosity _____ A5
Gardner color _____ 11+

This vehicle dried to a clear film. When one part by weight of tris (2-chloroethyl) phosphate per part of vehicle solids was dissolved in the vehicle, the resulting vehicle also dried to a clear film which exhibited fire retardancy and intumesence when subjected to flame.

*Example XVI*

In the following tests 12" x 6" x 0.25" poplar boards were completely coated, three coats, 6 mils film with the coating of Example V prepared as in Example VI. Three days drying or curing were allowed between each coat. The coats were brushed on. Boards prepared in this manner were immersed in water at room temperature. They were removed at intervals and examined for appearance, intumescence and fire retardance. The following is a tabular summary of the results obtained:

*Example XVII*

Phenoxyglyceryl ether (33 grams, 0.38 equivalent), triethylene glycol (28.5 grams, 0.38 equivalent), Cellosolve acetate (64 grams) and xylene (64 grams) were charged to a glass flask provided with a thermometer, inlet for nitrogen, stirrer, water trap, reflux condenser and heating mantel. This mixture was boiled for an hour during which water and xylene were removed from the system. The mixture, after drying was completed, was cooled and 132 grams (1.52 equivalents) of tolylene diisocyanate (80 percent 2,4- and 20 percent 2,6-isomers) were added to it at 28° C. The temperature rose rapidly to 45° C. from the heat released by the reaction. Heat was then applied until the temperature of the reaction mixture reached 100° C. where it was kept throughout the preparation of the vehicle. The total heating time was 10 ¾ hours. At the end of this period, the percent NCO of the vehicle was 9.93.

The following analysis of the finished vehicle is given:

Non-volatile _____ percent__ 57.2
NCO _____ do____ 97.6
Free tolylene diisocyanate _____ do____ 4.13
Viscosity (Gardner) _____ C
Color (Gardner) _____ 1 minus A fire retardant vehicle at 55 non-volatile was prepared from this product by combining 100 grams of it with a composition made by grinding 28.6 grams of ethylene diamine tetraacetic acid, 28.6 grams of tris (2-chloroethyl) phosphate, 25 g. of Cellosolve acetate and 25 grams of xylene together in a ball mill. N-coco morpholine (0.57 grams) was dissolved in the resulting vehicle as a catalyst for curing.

This fire retardant vehicle was drawn down in a 3 mil film on a glass plate. This film dried in 2½ hours. The dried film had a Sward hardness of 28 after 1 week.

TABLE II

| Run | Coating Example V [1] | Number Coatings | Immersion, Hours | Appearance | Hardness | Intumescence | Fire Retardancy |
|---|---|---|---|---|---|---|---|
| 1 | A | 3 | 8 | Slight Whitening | Good | | |
| 2 | B on A | 1, 2 | 8 | No Whitening | do | | |
| 3 | A | 3 | 24 | Slight Whitening | do | Excellent | Excellent. |
| 4 | B on A | 1, 2 | 24 | No Change | do | do | Do. |
| 5 | A | 3 | 48 | Distinct Whitening | do | do | Do. |
| 6 | B on A | 1, 2 | 48 | No Change | do | do | Do. |
| 7 | A | 3 | 168 | Very White | do | do | Do. |
| 8 | B on A | 1, 2 | 168 | No Change | do | do | Do. |
| 9 | A | 3 | 336 | Very White | do | do | Do. |
| 10 | B on A | 1, 2 | 336 | No Change | do | do | Do. |

[1] A refers to the fully compounded coating including the chloroethyl phosphate and ethylene diamine tetra acetic acid. B refers to the same composition as A but without the ethylene diamine tetra acetic acid.

The data of the table show that coating A was subject to water leaching while a film of coating B on coating A was not. However, leaching of coating A was insufficient in the tests to give apparent harm to the coatings.

Also in another set of tests poplar panels 12" x 6" x 0.25" were coated completely with three coats of A or with two coats, 4 mils of A, with one topcoat of B. These coatings were brushed on at the rate of 2 mils per coat. At least two days were allowed between coats for suitable curing. Panels were immersed for 24 hours at 120° F. then removed and air dried for 8 hours and finally dried for 24 hours in an oven at 120° F. All panels showed excellent intumescence and fire retardance. Adhesion and hardness were not altered by this treatment. This warm water leaching test is given in Interim Federal Specification for Paint, Interior, White and Tints, Fire Retardant, TT–P–0026b (DOD), August 24, 1961.

This vehicle was coated by brushing onto ¼" birch plywood to a dried film thickness of 6.5 to 7.5 mils. After allowing this film to cure for several days, it was subjected to burning in the cabinet test. It showed excellent intumescence and fire retardance.

Another vehicle was made from the original urethane of this examle at 60 non-volatile using 100 grams of the urethane, 28.6 grams of tris (2-ethyl) phosphate, 7.1 grams of Cellosolve acetate, 7.1 grams xylene and 0.57 gram N-coco morpholine curing catalyst. This vehicle dried in 2½ hours, showed a hardness on glass of 18 Sward after 1 week and exhibited fire retardancy and some intumescence when burned at 6 mils dried film on ¼" birch plywood in the cabinet test.

We claim:
1. A normally liquid, moisture-curing composition con- sisting essentially of the reaction product of aromatic hydrocarbon diisocyanate, ether diol of the formula:

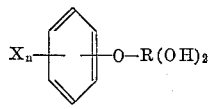

in which X is halogen having an atomic number from 17 to 35, $n$ is a number from 0 to 5 and R is alkylene of 3 to 12 carbon atoms, and polyol of the formula:

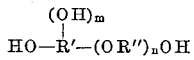

in which R' is aliphatic hydrocarbon of 2 to 12 carbon atoms, R" is alkylene of 2 to 4 carbon atoms, $m$ is 0 to 1, and $n$ is 0 to about 50, the amounts of said diisocyanate, ether diol and polyol being such to give a ratio of isocyanate to hydroxyl groups of about 1.5 to 2.5:1, and a weight ratio of ether diol to polyol of about 1:10 to 10:1.

2. The composition of claim 1 in which the diisocyanate is tolylene diisocyanate.

3. A normally liquid, moisture-curing composition consisting essentially of the reaction product of aromatic hydrocarbon diisocyanate, ether diol of the formula:

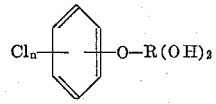

in which $n$ is a number from 3 to 5 and R is alkylene of 3 to 6 carbon atoms, and polyol of the formula:

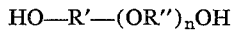

in which R' is saturated aliphatic hydrocarbon of 2 to 6 carbon atoms, R" is alkylene of 2 to 3 carbon atoms and $n$ is 0 to about 50, the amounts of said diisocyanate, ether diol and polyol being such to give a ratio of isocyanate to hydroxy groups of about 1.8 to 2.2:1, and a weight ratio of ether diol to polyol of about 1:3 to 3:1.

4. The composition of claim 3 in which the diisocyanate is tolylene diisocyanate.

5. The composition of claim 4 in which the ether diol is pentachlorophenoxy glyceryl ether.

6. The composition of claim 5 in which the polyol is triethylene glycol.

7. The composition of claim 6 in which the amounts of pentachlorophenoxy glyceryl ether and triethylene glycol are approximately equimolar.

8. A normally liquid, moisture-curing composition consisting essentially of the reaction product of aromatic hydrocarbon diisocyanate, ether diol of the formula:

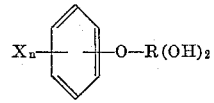

in which X is halogen having an atomic number from 17 to 35, $n$ is a number from 0 to 5 and R is alkylene of 3 to 12 carbon atoms, and a polyol of the formula:

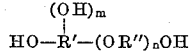

in which R' is aliphatic hydrocarbon of 2 to 12 carbon atoms, R" is alkylene radical of 2 to 4 carbon atoms, $m$ is 0 to 1, and $n$ is 0 to about 50, the amounts of said diisocyanate, ether diol and polyol being such as to give a ratio of isocyanate to hydroxyl groups of about 1.5 to 2.5:1, and a weight ratio of ether diol to polyol of about 1:10 to 10:1, said composition containing an amount sufficient to improve the fire retardant properties of a coating of said composition of tris (halogen lower alkyl) phosphate in which the halogen has an atomic number from 17 to 35.

9. The composition of claim 8 in which the halogen lower alkyl is monochloro alkyl of 2 to 3 carbon atoms.

10. The composition of claim 9 in which the amount of phosphate is about 30 to 50 weight percent based on the reaction product and the phosphate.

11. The composition of claim 8 which includes an amount sufficient to improve the fire retardant and intumescent properties of a coating of said composition of an alkylene diamine tetra acetic acid, said alkylene group having 2 to 4 carbon atoms.

12. The composition of claim 11 in which the alkylene diamine tetra acetic acid is ethylene diamine tetra acetic acid.

13. The composition of claim 12 in which the amount of ethylene diamine tetra acetic acid is about 30 to 50 weight percent based on the reaction product and the ethylene diamine tetra acetic acid.

14. The composition of claim 9 which includes an amount sufficient to improve the fire retardant and intumescent properties of a coating of said composition of ethylene diamine tetra acetic acid.

15. The composition of claim 14 in which the amount of phosphate is about 30 to 50 weight percent based on the reaction product and the phosphate, and the amount of ethylene diamine tetra acetic acid is about 30 to 50 weight percent based on the reaction product and the ethylene diamine tetra acetic acid.

16. The composition of claim 15 in which the phosphate is tris (chloroethyl) phosphate.

17. A normally liquid, moisture-curing composition consisting essentially of the reaction product of tolylene diisocyanate, pentachlorophenoxy glyceryl ether, and polyol of the formula:

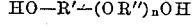

in which R' is saturated aliphatic hydrocarbon of 2 to 6 carbon atoms, R" is alkylene of 2 to 3 carbon atoms, and $n$ is 0 to about 50, the amounts of tolylene diisocyanate, glyceryl ether and polyol being such to give a ratio of isocyanate to hydroxy groups of about 1.8 to 2.2:1, and a weight ratio of ether diol to polyol of about 1:3 to 3:1, said composition containing a tris (monochloro alkyl) phosphate of 2 to 3 carbon atoms in said alkyl in an amount of about 20 to 60 weight percent based on said reaction product and phosphate, and ethylene diamine tetra acetic acid in an amount of about 20 to 60 weight percent based on said reaction product and said ethylene diamine tetra acetic acid.

18. The composition of claim 17 in which the polyol has 2 to 4 ethylene oxide units.

19. The composition of claim 18 in which the amounts of pentachlorophenoxy glyceryl ether and polyol are approximately equimolar with the polyol being triethylene glycol.

References Cited

UNITED STATES PATENTS

| | | | |
|---|---|---|---|
| 3,004,073 | 10/1961 | Wismer et al. | 260—613 |
| 3,134,743 | 5/1964 | Hoberman et al. | 260—23 |
| 3,171,819 | 3/1965 | Powanda | 260—2.5 |
| 3,264,233 | 8/1966 | Trescher et al. | 260—2.5 |
| 3,284,404 | 11/1966 | Schollenberger | 260—45.85 |

JAMES A. SEIDLECK, *Primary Examiner.*

DONALD E. CZAJA, *Examiner.*

V. P. HOKE, *Assistant Examiner.*